United States Patent [19]

Lobsiger et al.

[11] Patent Number: 4,838,628
[45] Date of Patent: Jun. 13, 1989

[54] PROCESS AND APPARATUS FOR PRODUCTION OF AN OPTICAL ELEMENT

[75] Inventors: Werner Lobsiger, Hanau am Main; Hans-Georg Lotz, Erlensee, both of Fed. Rep. of Germany

[73] Assignee: Leybold Heraeus GmbH, Cologne, Fed. Rep. of Germany

[21] Appl. No.: 881,642

[22] Filed: Jul. 3, 1986

[30] Foreign Application Priority Data

Dec. 12, 1985 [DE] Fed. Rep. of Germany ....... 3543812

[51] Int. Cl.⁴ .......................... G02B 5/28; G02B 27/14
[52] U.S. Cl. ..................................... 350/1.6; 350/166; 350/171
[58] Field of Search ................. 350/169, 1.6, 171, 166

[56] References Cited

U.S. PATENT DOCUMENTS

| | | | |
|---|---|---|---|
| 2,412,496 | 12/1946 | Dimmick | 350/166 |
| 2,672,502 | 3/1954 | Albright | 350/169 |
| 4,584,455 | 4/1986 | Tomizawa | 356/153 |

OTHER PUBLICATIONS

Smith, W. J. *Modern Optical Engineering*, McGraw-Hill, New York, p. 170.

*Primary Examiner*—Bruce Y. Arnold
*Attorney, Agent, or Firm*—Felfe & Lynch

[57] ABSTRACT

An apparatus and process thereof is disclosed of a partially reflecting optical element having a succession of dielectric layers of high and low refraction alternated on a substrate which is transparent to the longer wavelength of infrared radiation. The succession of layers is an anti-reflection layer for wavelengths of infrared radiation $\lambda_L$ and is a relfective layer for visible wavelengths $\lambda_K$.

7 Claims, 1 Drawing Sheet

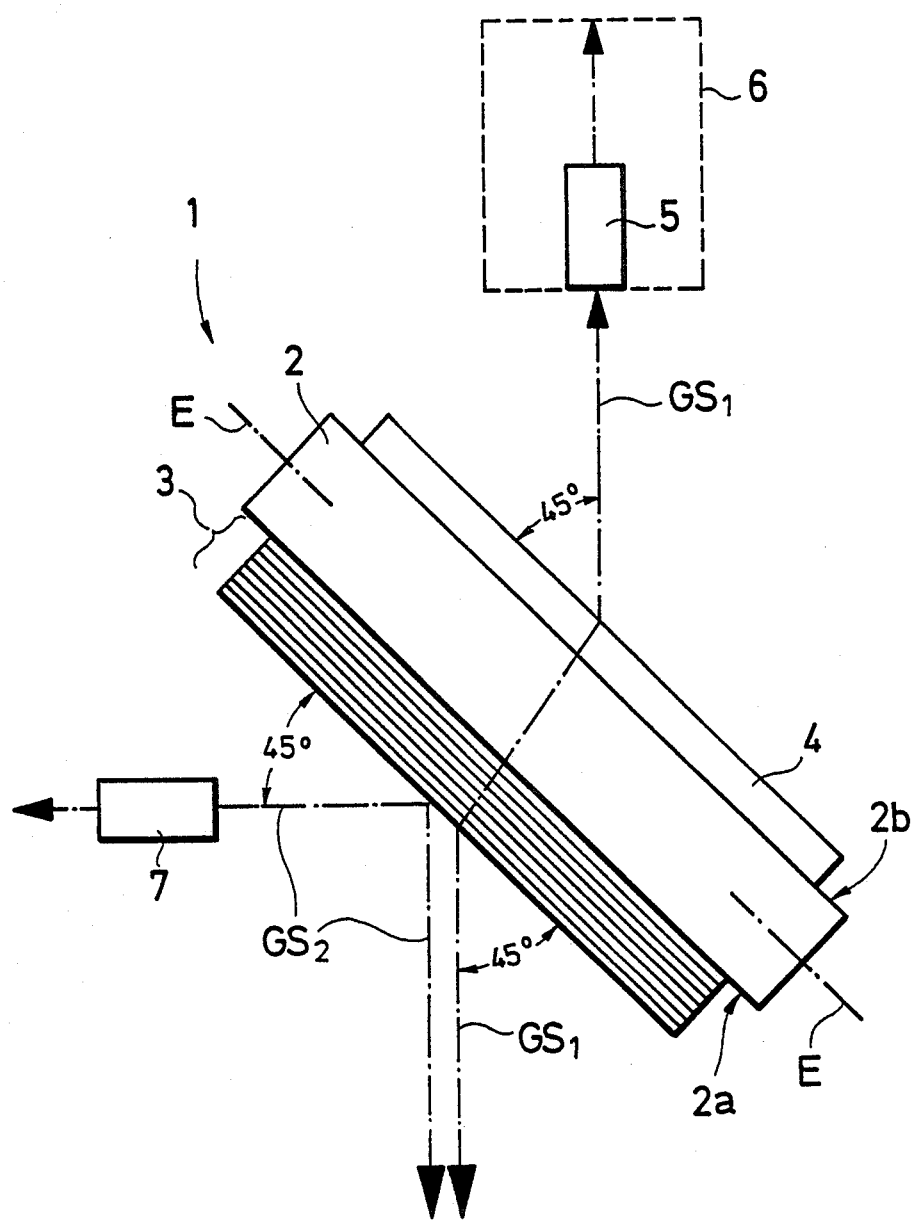

PROCESS AND APPARATUS FOR PRODUCTION OF AN OPTICAL ELEMENT

FIELD OF THE INVENTION

The invention relates to a process for producing an optical element, partially transparent or reflective depending on the wavelength of the incident radiation, by the alternating application of a succession of layers of dielectric materials of high and low refraction on a substrate, which is transparent at least to the longer wavelength radiation.

BACKGROUND OF THE INVENTION

Such processes for producing so-called interference layer systems with a great variety of spectral properties are known in large numbers. As a rule, it is a matter of configuring the gradient of the curve between the properties of transmission and reflection as steeply as possible, in order to confer the rather special spectral properties upon the filter or mirror in question. Included among these are the higher-grade anti-reflection layers, as well as optical filters, vaporized metal oxide mirrors, etc.

As a rule, only one optical axis is present in the known process products. Said axis runs perpendicularly to the surfaces of the optical element, at least, however, perpendicularly to the central portion of the optical element, when it is a question of, for example, lenses or parabolic mirrors.

The reference wavelengths $\lambda_K$ and $\lambda_L$ should be understood to be those wavelengths, which are characteristic for the differentiable regions for the reflection and transmission behavior. Thus, for example, the reference wavelengths $\lambda_K$ of 482, 555, 653 and 752 nm, given in Table 1 infra, are for the visible range between 400 and 800 nm, while the reference wavelengths $\lambda_L$ for the longer wavelength region i.e. Table 2 infra from 2,000 to 20,000 nm is obtained only as a calculated quantity, which is checked by measurement of the finished product. The measurement and control procedures during the build-up of the succession of layers are carried out either by photometry with visible light or by nonoptical measurement procedures such as the piezoelectric resonator method.

The concepts of long wavelength and short wavelength are, for the present purposes, to be considered as relative to one another. In general, however, a short wavelength light radiation is understood to be one with a $\lambda_K$ between 400 and 800 nm (visible light) and a long wavelength radiation is understood to be an infrared radiation with a $\lambda_L$ between 2,000 and 20,000 nm.

The spectral region from 2,000 to 20,000 nm (or 2 $\mu$m to 20 $\mu$m) is of great significance, especially for infrared techniques. The optical elements used for this purpose must be transparent in the stated infrared spectral region. Materials, such as germanium, silicon and the non-oxide chalcogenides come into consideration for this. However, they have the disadvantage of a strong absorption in the visible region of the spectrum and therefore are opaque to the eye. Conversely, the conventional types of glass, which are transparent for the visible spectrum, absorb a very high proportion of the radiation in the infrared region, so that they do not come into consideration for this. Finally, the materials mentioned, which are transparent to infrared, have a very high refractive index, which leads to considerable reflection losses at the surfaces and reduces the transmission correspondingly.

However, there is the practical requirement to visually follow long wavelength radiation, which is invisible to the eye; this is possible only if the beam path of the long wavelength radiation is assigned a beam path for visible light. These two requirements, as noted above, cannot be combined, at least not without some difficulties.

SUMMARY OF THE INVENTION

It is therefore an object of the invention to provide a process for the production of an optical element which, in conjunction with two at least partly different beam paths, has completely differentiated optical properties, that is, a very high transmission with respect to a radiation of long wavelength passing through practically in a straight line, but a very reflective behavior in the sense of a mirror with respect to radiation of short wavelength arriving at right angles thereto.

This objective is accomplished inventively by means of the process described at the beginning owing to the fact that:

(a) the total optical thickness "D" of the succession of layers is selected as a function of the reference wavelength $\lambda_L$ of the longer wavelength radiation to approximately $\lambda_L$ in such a way, that the succession of layers possesses the properties of an anti-reflection layer for $\lambda_L$ and that (b) within the total optical thickness "D" of the succession of layers, such a number of alternating individual layers of materials of high and low refraction is applied, that their individual optical thickness "s" is small in relation to the reference wavelength $\lambda_L$, but at the same time, however, and as a function of the reference wavelength $\lambda_K$ of the shorter wavelength radiation, has an optical thickness "s" of about $\lambda_K$, such that the succession of layers exhibits the properties of a reflection layer (mirror) for $\lambda_K$.

In this connection, the total thickness D is defined as the quarter-wave optical thickness, that is, four times the sum of all the geometric thickness $d_i$ of the individual layers, in each case multiplied by the directly applicable refractive index $n_i$, "i" representing the consecutive numbering within the succession of layers.

The quarter-wave optical thickness "s" of each individual layer, hereinafter referred to as its "optical thickness," can be calculated for rays coming in vertically as follows:

$$s_i = 4 \times n_i \times d_i.$$

The achievement of the characteristic feature (a) is that the longer wavelength radiation can pass through the substrate material largely without being impeded, that is, the materials, mentioned above, namely germanium, silicon and non-oxide chalcogenides, possess very good transmission properties in this wavelength region. Due to the behavior of the succession of layers as an anti-reflection layer, the otherwise very interfering reflection of the longer wavelength radiation is reduced from abut 30% to about 3%, that is, to about one tenth the value of the uncoated substrate. The longer wavelength radiation cannot "perceive" the subdivision of the layer in question into individual layers.

The achievement of the characteristic feature (b) is that the shorter wavelength radiation, especially visible light, is reflected practically completely by a surface of the substrate so coated, so that the poor transmission behavior of the substrate material in the visible range of the spectrum no longer has to be taken into consideration.

This, of course, presupposes that the inventively produced optical element for combining or separating the two beam paths of visible and invisible radiation has to be assigned in a particular manner to the two beam paths. The optical element therefore becomes particularly functional, if it is formed by a plane-parallel plate, with its principal plane aligned at an angle of 45 degrees to the two beam paths, initially running at right angles to one another. The effect of this procedure is explained in greater detail by means of the attached FIGURE in the detailed description.

The invention moreover relates to a partially transparent or reflecting optical element with a succession of layers of alternating dielectric materials of high and low refractive index on a substrate, which is transparent at least to the longer wavelength radiation.

To accomplish the same objective, such an optical element is characterized by the fact that
(a) the total optical thickness "D" of the succession of layers is selected as a function of the reference wavelength $\lambda_L$ of the longer wavelength radiation to approximately $\lambda_L$ in such a way that the succession of layers possesses the properties of an anti-reflection layer for $\lambda_L$ and that
(b) within the total optical thickness "D", such a number of alternating individual layers of materials of high and low refraction is applied, that their individual optical thickness "s" is small in relation to the reference wavelength $\lambda_L$, but at the same time, however, and as a function of the reference wavelength $\lambda_K$ of the shorter wavelength radiation, has an optical thickness "s" of about $\lambda_K$, such that the succession of layers exhibits the properties of a reflection layer (mirror) for $\lambda_K$.

In this connection, it is particularly advantageous to align the optical element with its principal plane E-E at an angle of 45 degrees to the two beam paths $GS_1$ and $GS_2$ for the short wavelength and the long wavelength radiation.

While in this case the beam paths arrive at the optical element from the viewing or evaluating side at an angle of 90 degrees to one another and at an angle of 45 degrees to the optical element, they run parallel to one another after their transmission or reflection, so that the same object can be followed by evaluating equipment responding to infrared radiation as well as also visually.

BRIEF DESCRIPTION OF THE DRAWINGS

An example of the operation of the object of the invention is described in greater detail by means of the FIGURE and a process example.

The FIGURE is a diagrammatic illustrating the optical element in conjunction with two beam paths $GS_1$ and $GS_2$.

DETAILED DESCRIPTION OF THE PREFERRED EMBODIMENTS

In the FIGURE, an optical element 1 is shown, which comprises a substrate 2 with an inventive succession of layers 3 and a conventional anti-reflection layer 4.

The substrate 2 is a plate of germanium, bounded by plane-parallel surfaces 2a and 2b and having a refractive index of n=4.0. This substrate material is transparent to the radiation of longer wavelength from a radiation source 5, which is part of an evaluating device 6, to which a portion of the radiation returns. The optical axis of the radiation source defines a first beam path $GS_1$, which runs at an angle of 45 degrees to the principal plane E-E of the optical element 1, this principal plane E-E, by definition, running in the center between the plane-parallel surfaces 2a and 2b. The parallel displacement within the beam path $GS_1$ is brought about by the known laws of optics.

The anti-reflection layer 4 is designed for the radiation of longer wavelength from the radiation source 5. The manufacture and structure of such an anti-reflection layer is, however, state of the art, so that there is no need to go into further details on this subject.

On that side of the substrate 2, on which the succession of layers 3 of the invention is located, there is moreover an optical system 7, which is the type of optical system that can be used in binoculars. This defines with its optical axis a second beam path $GS_2$, the angles of incidence and reflection of which are also 45 degrees relative to said principal plane E-E, as shown in the FIGURE. By these means, two parallel beam paths are produced from two beam paths that originally were at an angle of 90 degrees to one another.

The succession of layers 3 of the invention, which is shown only very schematically in the FIGURE, has the construction given in the following Table, the layers being numbered in the sequence in which they are manufactured, that is, the layer numbered 1 lies directly against substrate 2:

TABLE 1

| Layer Number | Layer Material | Optical Thickness "s" |
|---|---|---|
| 18. | ZnS = | 482 nm |
| 17. | ThF$_4$ = | 555 nm |
| 16. | ZnS = | 482 nm |
| 15. | ThF$_4$ = | 555 nm |
| 14. | ZnS = | 482 nm |
| 13. | ThF$_4$ = | 555 nm |
| 12. | ZnS = | 482 nm |
| 11. | ThF$_4$ = | 555 nm |
| 10. | ZnS = | 482 nm |
| 9. | ThF$_4$ = | 752 nm |
| 8. | ZnS = | 653 nm |
| 7. | ThF$_4$ = | 752 nm |
| 6. | ZnS = | 653 nm |
| 5. | ThF$_4$ = | 752 nm |
| 4. | ZnS = | 653 nm |
| 3. | ThF$_4$ = | 752 nm |
| 2. | ZnS = | 653 nm |
| 1. | ThF$_4$ = | 752 nm |
| SUBSTRATE | total: D = | 11,002 nm |

The construction of the layers in the Table is, however, given only by way of example and is also only conditionally critical with respect to the number of individual layers. For example, the number of individual layers required is proportional to the position of the desired minimum of the reflection curve. On an order of magnitude, the following relationships apply:

TABLE 2

| Minimum at Number of (wavelength) | Layers |
|---|---|
| 4,500 nm | 8 |
| 5,500 nm | 10 |
| 6,500 nm | 12 |
| 7,500 nm | 14 |

EXAMPLE:

In a vacuum metallizing installation, type A 1100 Q (Manufacturer: Leybold-Heraeus GmbH), the succession of layers, given in the Table, with a total of 18 individual layers was produced on a germanium substrate. The plate-shaped germanium substrates, with a diameter of 25 mm and a thickness of 1 mm, were clamped in a spherical holding device, which rotates above the evaporating sources for the two coating materials at a distance of about 50 cm. During the vapor deposition operation, the substrates were brought to a temperature of 150° C. by radiant heat. The coating materials, thorium fluoride in the one case and zinc sulfide in the other, were vaporized from tantalum and tungsten boats respectively, which were heated by the direct passage of current.

The system was evacuated within 30 minutes to a pressure of $5 \times 10^{-4}$ Pa. After a heating period of one hour, the substrates were pretreated (purified) in an argon atmosphere at a pressure of 5 Pa for 10 minutes in a corona discharge, whereupon the layers of $ThF_4$ and ZnS subsequently were vapor deposited at a pressure of $2 \times 10^{-4}$ Pa in alternating sequence and at the thicknesses given.

The build-up of the layers and the control of the evaporating sources were accomplished by means of an optical thickness meter of known construction.

The optical elements, produced in this manner, had a maximum reflection in excess of 90% in the visible region. At the same time, the reflection in the infrared region, which amounted to about 30% for germanium substrates that had not been coated, was reduced to about 3% at a wavelength of 10,000 nm.

As is evident from Table 1, the sum of all the optical layer thicknesses was 11,002 nm. This is a value, which corresponds very well with the longer wavelength reference wavelength $\lambda_L$ of 10,000 nm. Moreover, it can be concluded from the Table that the optical thickness of the individual layers, which lie between 482 nm and 752 nm, correspond to the reference wavelengths of $\lambda_K$ of the shorter wavelength radiation within the range of 400 to 800 nm.

It follows from the preceding exposition that the refractivities of the individual layers as well as of the total number of layers must be matched to each other in such a manner that there is a high reflection effect (mirroring) in the visible range of the spectrum and, at the same time, that the reflection of the penetrating infrared radiation is decreased at the surface of the optical element and the transmission is thus increased. The reflection band in the visible region comprises the easily manufactured quarter-wave systems (if the geometric thickness of the layers is considered), without having to undertake any measures for the infrared anti-reflection coating. The wavelength region of the reflection minimum for the longer wavelength radiation is fixed by the total optical thickness of the reflection band in the visible region. By so doing, additional measures, which otherwise would be required for transmission of the longer wavelength radiation, can be omitted in the layer system, since this system, in its totality, represents an anti-reflection coating for the longer wavelength radiation. The surprising effect is based on the fact that the longer wavelength radiation does not "perceive" the numerous individual layers within the total thickness D, so that the succession of layers in question represents practically a homogeneous layer for the longer wavelength radiation.

We claim:

1. An optical system including an optical element having a reflective property relative to a wavelength $\lambda_K$ of incident light in a range of the visible spectrum and having a transmissive property relative to a wavelength $\lambda_L$ in the range of infrared radiation comprising:
   (a) a beam path for radiation having a wavelength $\lambda_K$ in the range of 400 to 800 nm;
   (b) a beam path for radiation having a wavelength $\lambda_L$ in the range of 2,000 to 20,000 nm;
   (c) a planar substrate having a first side, a second side and a linear axis, said planar substrate positioned in said first and second beam paths to transmit the wavelength $\lambda_L$ through the substrate; and
   (d) a plurality of dielectric layers attached to the first side of said substrate and having an alternating arrangement of the layers, such that a layer having a high refraction index is positioned adjacent a layer having a lower refraction index, each of said dielectric layers having an optical thickness less than the wavelength $\lambda_L$ and about the wavelength $\lambda_K$ such that the plurality of dielectric layers reflects the wavelength $\lambda_K$, and said plurality of dielectric layers provides an antireflection layer for the wavelength $\lambda_L$.

2. The optical element according to claim 1 further comprising an anti-reflective layer attached to said second side of said substrate to transmit the wavelength $\lambda_L$ through the substrate.

3. The optical element of claim 1 wherein said substrate has a refractive index of about $n=4.0$.

4. The optical element of claim 3, wherein said substrate further comprises a material of the group consisting of germanium, silicon and a non-oxide chalcogenide.

5. An optical system including an optical element having a reflective property relative to a wavelength $\lambda_K$ of incident light in a range of the visible spectrum and having a transmissive property relative to a wavelength $\lambda_L$ in the range of infrared radiation, said system comprising:
   (a) a beam path for radiation having a wavelength $\lambda_K$ in the range of 400 to 800 nm;
   (b) a beam path for radiation having a wavelength of $\lambda_L$ in the range of 2,000 to 20,000 nm;
   (c) a planar substrate included in the optical element, said substrate having a first side, a second side and a linear axis, said planar substrate positioned in said first and second beam paths to transmit the wavelength $\lambda_L$ through the substrate:
   (d) a plurality of dielectric layers included in the optical element, said layers attached to the first side of said substrate and having an alternating arrangement of the layers, such that a layer having a high refraction index is positioned adjacent a layer having a lower refraction index, each of said dielectric layers having an optical thickness less than the wavelength $\lambda_L$ and about the wavelength $\lambda_K$ such that the plurality of dielectric layers reflects the wavelength $\lambda_K$ and provides an anti-reflection layer for the wavelength $\lambda_L$
   (e) a means for evaluating the transmissivity of the optical element for light of wavelength $\lambda_L$.

6. The optical element of claim 1 wherein said planar axis of said substrate is positioned at about 45° relative to the beam path for $\lambda_K$ and the beam path for $\lambda_L$.

7. A method for transmitting an infrared wavelength of $\lambda_L$ through an optical element comprising the steps of:
 (a) providing a beam path for incident light having a wavelength $\lambda_K$ in the range of 400 to 800 nm;
 (b) providing a beam path for infrared radiation having a wavelength $\lambda_L$ in the range of 2,000 to 20,000 nm;
 (c) positioning a planar substrate having a first side, a second side and a planar axis in said first and second beam paths so as to transmit said wavelength $\lambda_L$ and to reflect said wavelength $\lambda_K$;
 (d) attaching a plurality of dielectric layers to said first side of said substrate, said layers having an alternating arrangement of layers of a high refraction index and a lower refraction index, each of said dielectric layers having an optical thickness less than the wavelength $\lambda_L$ and about the same as the wavelength $\lambda_K$, such that the plurality of dielectric layers has a total optical thickness exhibiting a propety of a reflection layer for the wavelength $\lambda_K$ and exhibiting a property of an anti-reflection layer for the wavelength $\lambda_L$;
 (e) coating said second side of said substrate with an anti-reflection layer to transmit the wavelength $\lambda_L$ through the substrate; and
 (f) evaluating the transmissivity of the optical element for light of wavelength $\lambda_L$.

* * * * *